United States Patent [19]

Barouh et al.

[11] 4,161,551
[45] Jul. 17, 1979

[54] ADHESIVELY CORRECTABLE TRANSFER MEDIUM WITH DELAYED ALTERATION RESISTANCE CHARACTERISTICS

[75] Inventors: Victor Barouh, Old Westbury; George Rottmann, Jackson Heights; Salvatore DeSimone, Brooklyn, all of N.Y.

[73] Assignee: Eaton Allen Corp., Brooklyn, N.Y.

[21] Appl. No.: 781,023

[22] Filed: Mar. 24, 1977

[51] Int. Cl.² .............................................. B41J 31/06
[52] U.S. Cl. ........................................ 428/539; 106/20; 106/22; 106/28; 283/8 B; 283/9 R; 428/915; 428/916; 427/7; 400/237
[58] Field of Search ............... 101/426; 106/20, 22, 106/23, 28, 21, 27; 197/172; 283/8 R, 8 A, 8 B, 9 R, 9 A; 427/7; 428/914, 915, 916, 307, 539, 469

[56] References Cited

U.S. PATENT DOCUMENTS

| | | | |
|---|---|---|---|
| 2,338,042 | 12/1943 | Kline | 106/27 |
| 2,382,861 | 8/1945 | Curado | 101/426 X |
| 2,441,300 | 5/1948 | Bunte | 106/20 |
| 3,105,769 | 10/1963 | Ellerin | 106/28 |
| 3,671,287 | 6/1972 | Maniar | 197/172 X |
| 3,778,395 | 12/1973 | Huelsman et al. | 106/28 X |

FOREIGN PATENT DOCUMENTS 819319  9/1959  United Kingdom ..................... 106/27

Primary Examiner—George F. Lesmes
Assistant Examiner—Bruce H. Hess
Attorney, Agent, or Firm—Lackenbach, Lilling & Siegel

[57] ABSTRACT

An ink formulation which may be coated on a flexible substratum to produce a typewriter ribbon or the like, wherein the impression made from such a ribbon is capable of adhesive removal shortly after being created on all conventional typing papers, but which impression exhibits delayed alteration resistance whereby any attempt at correcting or removing the indicia by pressure sensitive adhesive means or, altering the indicia by erasing and the like, will leave an obvious and permanent indication that a removal was attempted.

8 Claims, 2 Drawing Figures

FIGURE I

PERFORMANCE TEST OF DAR (25% Cotton Trojan Bond)

| | | |
|---|---|---|
| MMMMMMMMMMMMMMMMMM | MM | Immediate |
| MMMMMMMMMMMMMMMMM | MM | 5 min |
| MMMMMMMMMMMMMMMM........ | MM | 15 min |
| MMMMMMMMMMMMMMMM............ | MM | 30 min |
| MMMMMMMMMMMMMMMM................ | MM | 1 hr |
| MMMMMMMMMMMMMMMMM.................. | MM | 2 hrs |
| MMMMMMMMMMMMMMMMMM.................... | MM | 4 hrs |
| MMMMMMMMMMMMMMMMMM...................... | MM | 6 hrs |
| MMMMMMMMMMMMMMMMMM........................ | MM | 8 hrs |
| MMMMMMMMMMMMMMMMMMM........................ | MM | 24 hrs |
| MMMMMMMMMMMMMMMMMMMMMMMMMMMMMMMMMMMMMM | | |

FIGURE 2

PERFORMANCE TEST DAR (Basket Weave Safety Bond)

| | | |
|---|---|---|
| MMMMMMMMMMMMMMMM | MM | Immediate |
| MMMMMMMMMMMMMMMM | MM | 5 min |
| MMMMMMMMMMMMMMMM ............................MM | | 15 min |
| MMMMMMMMMMMMMMMM............................MM | | 30 min |
| MMMMMMMMMMMMMMMM............................MM | | 1 hr |
| MMMMMMMMMMMMMMMM............................MM | | 2 hrs |
| MMMMMMMMMMMMMMMM............................MM | | 4 hrs |
| MMMMMMMMMMMMMMMM............................MM | | 6 hrs |
| MMMMMMMMMMMMMMMM............................MM | | 8 hrs |
| MMMMMMMMMMMMMMMM............................MM | | 24 hrs |
| MMMMMMMMMMMMMMMMMMMMMMMMMMMMMMMMMMMMMMM | | |

ADHESIVELY CORRECTABLE TRANSFER MEDIUM WITH DELAYED ALTERATION RESISTANCE CHARACTERISTICS

BACKGROUND OF THE INVENTION

1. Field of the Invention

The present invention relates broadly to a novel transfer media or ink composition, which when coated on a thin flexible substratum is useful in the production of typewriter ribbon, carbon paper and the like, and more particularly to produce an adhesively correctable film typewriter ribbon having delayed alteration resistance which is especially adapted for use in conjunction with an adhesive lift off tape of the type that is used to lift off typed indicia. The delayed alteration resistant typewriter ribbon made in accordance with the present invention is especially adapted for use with lift off tapes and typewriters such as the Correcting Selectric typewriter manufactured by International Business Machines Corporation. This invention eliminates complete adhesive "lift off" of a typewritten indicia from the typing bond after a predetermined time duration while allowing for complete adhesive removal of any image a short time after the indicia is typed or transfered onto typing bond.

2. Description of the Prior Art

Transfer media now in common use and known as "correctable film ribbons" usually comprise a flexible carrier substrate such as polyethylene, or the like on which is coated a pressure sensitive transfer coating. Upon type font impact or stylus pressure such ribbons produce non-wetting impressions on typing bond paper or similar surfaces. The correction of erroneously typed impressions is accomplished by the utilization of a lift off tape or tabs. The lift off tapes or tabs consist of a flexible carrier substrate, such as polyethylene terephthalate that is provided on one side with an adhesive coating, which, when brought into firm contact with typed impressions, will adhesively remove or "lift off" such impressions. Corrections made in this manner have the advantage of being virtually invisible. This, however, is also their disadvantage, particularly in the case of legal documents and commercial paper. The ability to correct an error undetectable at some later time can also be used to falsify documents which cannot readily be detected.

SUMMARY OF THE INVENTION

This invention overcomes the disadvantages of the prior art ink formulations by providing a means to form a typewritten indicia which is readily removable both by adhesive means and by erasure for a short period of time, after which a burn or indelible mark is created in the paper bond underlying the indicia coextensive therewith which remains even after the typed indicia is removed. Furthermore, adhesive removal of the typewritten image once typed on the typing bond is rendered impossible after a predetermined period of time.

This invention eliminates unlimited corrections with respect to time by limiting the time period during which a perfect correction can be made by imparting to the indicia produced by a ribbon of the present invention essentially a temporary alteration capability.

It is an object of the present invention to create a typewritten image which cannot be effectively removed after a predetermined period of time by the addition of either zinc chloride, strontium chloride and Schweizer Solution or an oil soluble dye to a base non-wetting ink formulation.

It is a further object of the present invention to create an imaging ink formulation containing a water soluble salt, thereby giving the ink a delayed alteration resistance.

It is still yet another object of the present invention to provide an ink formulation wherein it contains a component or components which will migrate gradually toward the typing bond and react therewith to create an indelible image on the paper beneath the typed character.

It is a further object of the present invention to provide a simple and inexpensive formulation for producing a delayed alteration resistance ink and typewriter ribbon.

The potential for this invention in the legal and financial communities is enormous. Prior to adhesively correctable inks any changes that had to be made to a document, check or other commercial paper was by means of erasure or one of many means of opaquing. Since such procedures are completely visible, it necessitated either an initialling of the change or the destruction of the document. If it was a check, it was required to be destroyed.

The widespread usage of correctable film ribbons with its companion lift off tape or tabs has allowed virtually invisible corrections even after indefinite periods of time. Although generally advantageous, its disadvantage of making it possible to alter documents and checks undetected has created severe problems of security not only for the legal and financial users but also for the manufacturer who has been forced to install security devices in the typewriter which prevents the typewriter from accepting a correctable film ribbon. It is a further object of this invention to eliminate these disadvantages.

The foregoing together with various ancillary objects, features and advantages of the present invention will become apparent from the following description of the preferred embodiments, and the accompanying drawings, by way of example only, wherein:

BRIEF DESCRIPTION OF THE DRAWINGS

FIG. 1 is a copy of test using a preferred embodiment ink formulation with a 25% cotton bond paper; and FIG. 2 is a copy of a similar test using the same ink formulation as in FIG. 1 on a basket weave safety bond paper.

DETAILED DESCRIPTION OF THE INVENTION

In the present invention there is utilization of any oil soluble dye which, in connection with a non-wetting ink, serves to eventually stain or mark the typing paper. A small amount of oil in the ink formulation behaves as a non volatile, free-flowing, high capillary response carrier of the dye. Castor oil has been found to be suitable and the oil is intended to comprise from 5 percent to 0.001 percent of the total ink composition. The transferred indicia made from such an ink, carrying the "oil dye" can be "lifted off", soon after it is implanted on the paper, by lift off tapes or tabs. However, the dye soon bleeds through to the paper by capillary action of the fibers of the image sheet until later removal of an image by adhesion or erasure becomes obvious. The amount of the oil soluble dye can be varied within relatively wide limits, according to the speed of the desired resistance to alteration. In practice it has been found that depending on the oils and/or plasticizers used in the ink formulation as little as 0.4% by weight of oil soluble dye in the ink coating composition and as much as 8% can be used to effect the desired result.

An example of producing a preferred ink formulation containing an oil soluble dye is as follows:

EXAMPLE I

In a ball mill or a completely enclosed attritor the following ingredients are ground for approximately 2½ hours:

- 52 parts methyl ethyl ketone
- 6 parts tricresyl phosphate
- 6 parts vinyl chloride-vinyl acetate copolymer (Union Carbide resin VYGH)
- 13 parts oleic acid
- 2½ parts Calco Oil Black Liquid (American Cyanamid)
- 15 parts Raven Black 1255
- 1 part Castor Oil The resulting coating solution is applied by means of a roller coater to yield a dry coating weight of 2½ lbs. per 3000 sq. ft. Any compatible flexible thin substratum may be used to receive the coating such as ¾ mil high density polyethylene, or the like. After the solvents has evaporated or been removed, the dried product is wound on a roll and further processed into typewriter ribbons by conventional means.

It is possible to create an ink which leaves an image on the bond on which it is placed, and which leaves an indelible mark after adhesive removal only after the passage of time due to surface etching the paper through the addition to the coating composition of a suitable etching agent. Such an etching agent or compound preferably fulfills the following criteria: (a) Having at least partial compatibility with the coating composition so as not to upset its stability and its rheological properties; (b) Not affecting the shelf life of the ribbon or coated film; (c) Not detrimentally affecting the imaging quality of the transfer layer; (d) Not detrimentally affecting the initial "lift off" ability (correctability) of typed indicia; and (e) Slowly reacting with, or etch the surface of the underlaying image paper or bond, so as to impair the correctability of typed indicia with the passage of time.

Examples of suitable etching agents are: water soluble salts and in particular preferrably zinc chloride, strontium chloride and Cu(OH)$_2$ in NH$_4$OH (Schweizer Solution or reagent). When these materials are singly or in combination, brought into contact with the surface of conventional typing bond paper as part of the indicia producing transfer of dry ink, they slowly attack or etch the underlying fibers of the bond paper, thereby making it impossible to remove typed indicia without leaving a distinctive residual image after the lapse of a predetermined period of time. It is believed that a process of esterification of the free oxyhydrils present in the alpha cellulose of the typing bond takes place when the etching agent reacts with conventional typing paper. Accordingly, most water soluble salts will serve to etch conventional typing papers and are compatible in non-wetting inks.

The speed of the reaction, and therefore the delayed alteration effect, varies slightly with such conditions as the moisture content of the typing bond, its cotton content and the relative humidity and temperature of the atmosphere. The percentage of the etching agent in the coating composition also affects the speed of the reaction, the greater the additive content, the faster the reaction.

Generally, percentages of 0.25 to 35% by weight of etching agent will cause a delayed alteration resistance effect which starts noticeably after 5 to 40 minutes, is obvious after 90 to 300 minutes and maximizes in 16 to 36 hours. However, the preferable range of the etching agent is between 0.5 to 35%, more preferably from 0.8 to 35% and yet more preferably from 0.1 to 35%. It should be noted that the amount added may differ for varying ink formulations and with the desired delay in reaction time. The following examples indicate preferred embodiments as various water soluble salts as well as various conventional non-wetting inks are suitable and compatible.

The following examples are preferred ink compositions having etching agents, which inks exhibit a delayed alteration resistance after 5 minutes but are completely adhesively removable within the five minute period. In all the following examples the coating may be applied by a roller or a roller and wire bar combination to yield a dry coating weight of 2½ lbs. per 3,000 square feet on a suitable carrier or substrate.

EXAMPLE II

- 8 parts polyamid P 1560 (Lawter Chemical Co.)
- 17 parts HB-40 hydrocarbon plasticizer (Monsanto)
- 22 parts toluol
- 22 parts isopropanol
- 2 parts Raven Black 155
- 6 parts zinc chloride This mixture was ground in the ball mill for 12 hours prior to coating.

EXAMPLE III

- 14 parts pliolite resin ACL (Goodyear Chemical Co.)
- 10 parts hexyl decyl stearate
- 10 parts mineral oil (Sunthene 420)
- 72 parts toluol
- 8½ parts strontium chloride This mixture was ground in the ball mill for 8 hours prior to coating as well as the below mixture.

EXAMPLE IV

- 9 parts polyamid resin (Emery 3749)
- 12 parts dioctyl phthalate
- 7 parts butyl stearate
- 6 parts mogul L (Carbon Black—Cabot Co.)
- 5 parts petrolatum
- 40 parts isopropanol
- 20 parts toluol
- 3 parts Schweizer Solution It has been found that conventional non-wetting base ink formulations will function to produce a delayed alteration resistant indicia when suitable percentages of etching agents are added thereto. Furthermore, it is also possible to include an oil soluble dye as well as the before mentioned etching agent in the same formulation and obtain suitable delayed alteration resistance.

The results of performance tests of delayed alteration resistant inks made according to the present invention are shown in FIGS. 1 and 2. In FIGS. 1 and 2 ink according to Example II was utilized and made into a typewriter ribbon. In FIG. 1 the paper is a 25% cotton typing bond known as Trojan Bond.

In FIG. 2 the paper is a basket weave Safety Bond which is the type of paper most widely used in the imprinting of checks and commercial paper. The test letter in both tests was a capital "M" typed 44 times across the face of the page. All eleven lines were typed consecutively. The typewriter utilized was the IBM Correcting Selectric II typewriter. The typewriter was set at pressure #3.

At various time intervals which are indicated on the right side of the figure, attempts were made to adhesively lift-off approximately half of the letters on the line beginning with the third from the last letter on the line. Such a procedure was chosen in order to provide a contrast with the remaining impressions on the line. The attempts were made using the correction mechanism of the typewriter including a standard adhesive lift-off tape.

The lift-off of the letters on the line marked "immediate" was attempted immediately after all of the eleven lines of the test were typed. As can be readily seen, total lift-off was successfully accomplished in that no discernible image was effected. The next attempt was made 5 minutes later, and, as can be seen from the line so marked, a very slight trace of the impression may be discerned upon close examination.

Fifteen minutes after typing, another attempt was made to lift off the impression in the third line in both tests, and as readily seen there are indelible indications of resistance to alterations. Generally, the resistance to alteration increases as time progresses until about 6–8 hours when the image of the typed character attempted to be adhesively lifted-off is discernible and finally, at the end of 24 hours, the image is clearly visible and it is as if no attempt was made to lift it off.

The same test procedure was repeated in both the tests whose results are shown in FIGS. 1 and 2. The results achieved were similar, however, the Basket Weave Safety Bond exhibits a residual image which can be detected after five minutes. The 25% cotton typing bond is a conventional typing paper and similar tests with varying papers ranging up to 100% cotton exhibit substantially similar results at all different typing pressure levels.

While the examples above serve to describe and illustrate suitable and preferred compositions of non-wetting correctable ink formulations in accordance with the present invention, said ink formulations being especially suitable to produce an image yielding transfer layer for a typewriter ribbon, it should be understood that various changes, omissions and substitutes to the preferred embodiments may be made by those skilled in the art, without departing from the scope of the present invention.

We claim:

1. A typewriter ribbon for use with typing bond having an initially adhesively removable ink which ink exhibits a delayed alteration resistance comprising a thin substratum and said ink disposed thereon, said ink including a water soluble salt which in time etches the underlying typing bond.

2. A typewriter ribbon for use with typing bond having an initially adhesively removable ink which ink exhibits a delayed alteration resistance comprising a thin substratum and said ink disposed thereon, said ink including a water soluble agent which in time etches the underlying typing bond, said agent being zinc chloride.

3. A typewriter ribbon for use with typing bond having an initially adhesively removable ink which ink exhibits a delayed alteration resistance comprising a thin substratum and said ink disposed thereon, said ink including a water soluble agent which in time etches the underlying typing bond, said agent being strontium chloride.

4. A typewriter ribbon for use with typing bond having an initially adhesively removable ink which ink exhibits a delayed alteration resistance comprising a thin substratum and said ink disposed thereon, said ink including a water soluble agent which in time etches the underlying typing bond, said agent being Schweizer Solution.

5. A typewriter ribbon for use with typing bond having an initially adhesively removable ink which ink exhibits a delayed alteration resistance comprising a thin substratum and said ink disposed thereon, said ink including a water soluble agent which in time etches the underlying typing bond, said agent being zinc chloride, and the zinc chloride being between 0.5 to 35 percent of the total transfer layer by weight.

6. A typewriter ribbon for use with typing bond having an initially adhesively removable ink which ink exhibits a delayed alteration resistance comprising a thin substratum and said ink disposed thereon, said ink including a water soluble agent which in time etches the underlying typing bond, said agent being strontium chloride, and the strontium chloride being between 0.1 to 35% of the total ink composition by weight.

7. A typewriter ribbon for use with typing bond having an initially adhesively removable ink which ink exhibits a delayed alteration resistance comprising a thin substratum and said ink disposed thereon, said ink including a water soluble agent which in time etches the underlying typing bond, said agent being Schweizer Solution, and the Schweizer Solution being between 0.8 to 35% of the total ink transfer layer by weight.

8. A typewriter ribbon for use with typing bond having an initially adhesively removable ink which ink exhibits a delayed alteration resistance comprising a thin substratum and said ink disposed thereon, said ink including a thin substratum and an image yielding transfer layer, said transfer layer including a water soluble salt which in time etches the underlying typing bond, castor oil, and an oil soluble dye.

* * * * *